United States Patent

[11] 3,539,219

| [72] | Inventor | Edward G. Mueller |
| | | 5424 Parker St., Omaha, Nebraska 68104 |
| [21] | Appl. No. | 752,004 |
| [22] | Filed | Aug. 12, 1968 |
| [45] | Patented | Nov. 10, 1970 |

[54] VEHICLE TOP RECREATION PACKAGE
9 Claims, 13 Drawing Figs.

[52] U.S. Cl. ..................................... 296/23, 135/1
[51] Int. Cl. ..................................... B60p 3/34
[50] Field of Search........................... 296/23, 23(B); 135/(1A, 3A)

[56] References Cited
UNITED STATES PATENTS

| 2,845,663 | 8/1958 | Harr | 296/23B |
| 2,459,026 | 1/1949 | Hardy | 296/23B |
| 2,942,609 | 6/1960 | Ferguson | 296/23X |

*Primary Examiner*—Philip Goodmen
*Attorney*—Arthur Schwartz & Sarli

ABSTRACT: A combination boat used as a cover for a folding tent to be mounted on top of a vehicle, the tent and its component parts in its collapsed position being fully enclosed within the overturned boat-cover. The tent is erected after removal of the boat-cover.

Patented Nov. 10, 1970

INVENTOR
EDWARD G. MUELLER

BY Arthur Schwartz
ATTORNEY

Patented Nov. 10, 1970

3,539,219

INVENTOR
EDWARD G. MUELLER

BY *Arthur Schwartz*
ATTORNEY

Patented Nov. 10, 1970

INVENTOR
EDWARD G. MUELLER

BY     *Arthur Schwartz*

ATTORNEY

VEHICLE TOP RECREATION PACKAGE

OBJECTS AND BACKGROUND

This invention relates to a combination boat and tent device mounted on top of a vehicle.

The prior art type devices have been cumbersome in converting a tent from its folded position to an erect position and situated on top of a vehicle. Further, the prior art devices have not been able to provide the compact and well designed structure as shown in the instant invention.

It is an object of this invention to provide a station wagon camper with a tent that is foldable and collapsible which may be mounted without any modification to the vehicle top.

It is a further object to provide a small pram or boat which serves as a road or traveling cover for the tent and all the gear stored on top of the vehicle. This can include not only the tent and tent support, but also other types of camping gear under the overturned boat.

It is another object of the invention to provide a station wagon top mounted camper that provides not only a large sleeping area within a tent but also provides a fishing pram which is readily available at any time.

Still another object of the invention is to provide a station wagon camper that is compact in size and simple in construction and operation so that only one person is needed to erect or take down the camper in a minimum amount of time and without any additional assistance.

Another object is to provide a novel station wagon camper that requires no modifications to the vehicle and is so designed that there will be no adverse affects to the camping unit from wind and no noise created by the wind blowing through the unit.

It is still another object to provide a car top tent that is foldable so that it will extend over a width even greater than that of the vehicle.

SUMMARY OF THE INVENTION

One modification of the invention includes a tent floor that is foldable into several sections which will fit on top of the car. The supports for the tent itself are easily accomodated on the flooring and are easily erectable. The tent cover of conventional material is placed over the supports in its erected position. In its closed position a boat is used to cover the tent and supports and is secured to the carrier.

BRIEF DESCRIPTION OF THE DRAWINGS

The above objects and advantages of the invention will be better understood from the following detailed description of the drawings, wherein.

DETAILED DESCRIPTION OF THE INVENTION

Figure 1:
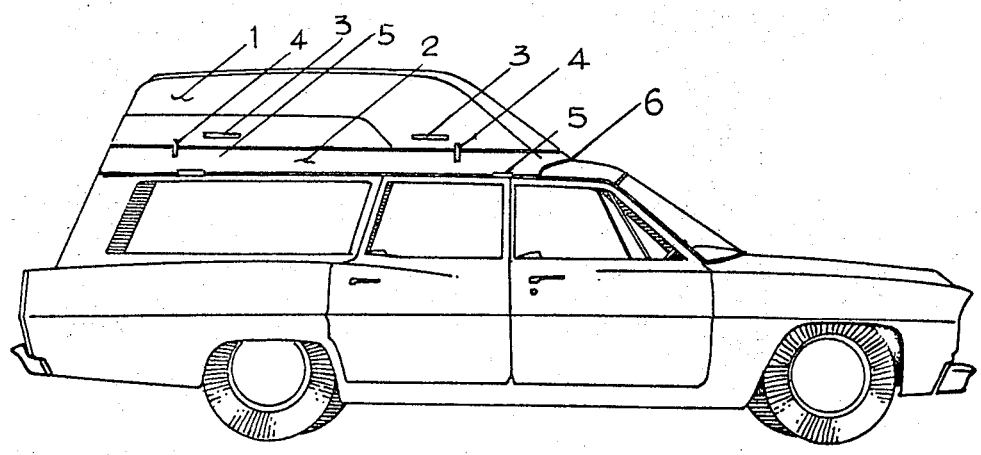
FIG. 1 shows a side elevation view of a station wagon recreation package in its closed or traveling position with the boat mounted on top of the tent on a carrier.
Figure 2:
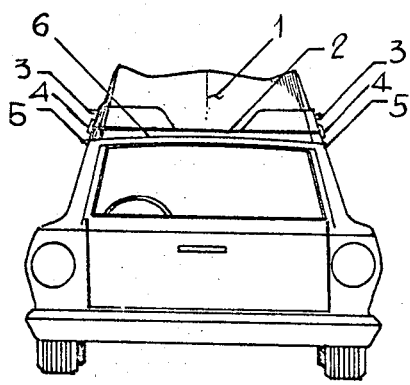
FIG. 2 is a rear elevation view of FIG. 1.
Figure 3:
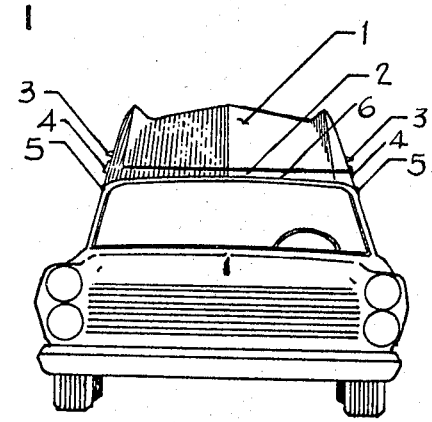
FIG. 3 is a front elevation view of FIG. 1.
Figure 4:
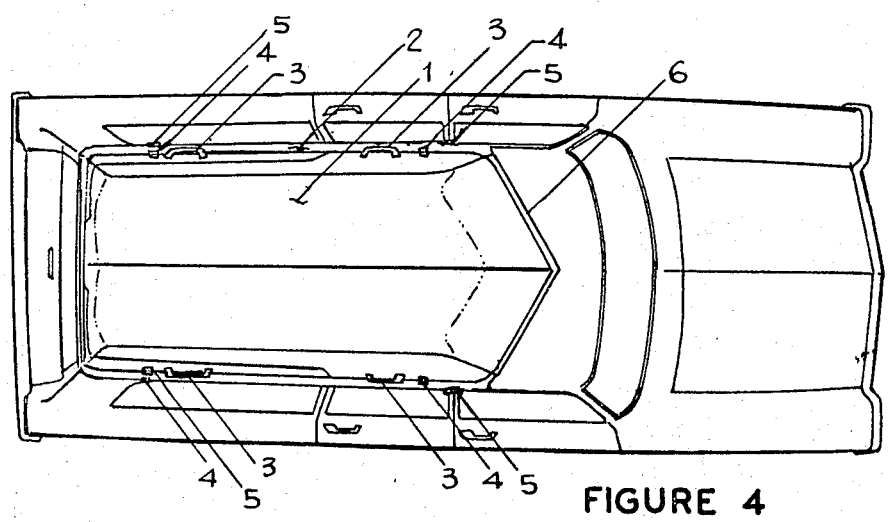
FIG. 4 is a top plan view of the invention of FIG. 1.
Figure 5:
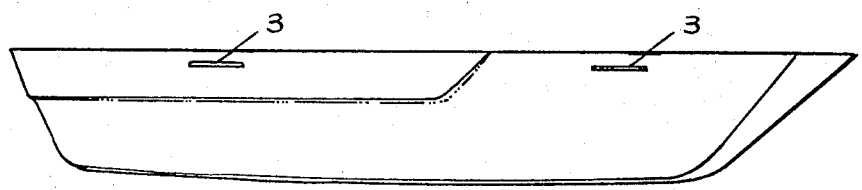
FIG. 5 is a side elevation view of the boat-cover.
Figure 6:
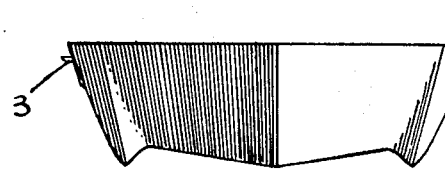
FIG. 6 is a front elevation view of the boat in FIG. 5.
Figure 7:
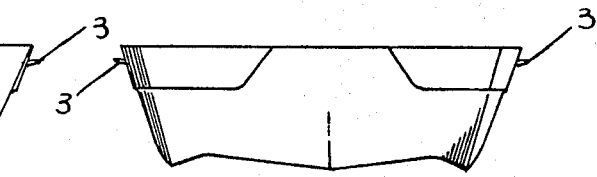
FIG. 7 is a rear elevation view of the boat of FIG. 5.
Figure 8:
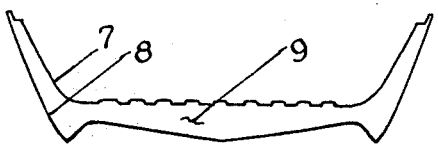
FIG. 8 illustrates a typical cross section of the boat.

With reference to the drawings, it will be seen that a boat or pram 1 is mounted on a roof top carrier 2 which is designed of sheet metal to conform to the contour of the roof of the vehicle. The carrier 2 is attached to the vehicle as will be described below by means of plastic or rubber seals. A plurality of handles 3 are positioned around the exterior of the pram to facilitate positioning and removal of the pram relative to the carrier 2. As seen in the drawings, the pram includes one pair of handles on each side.

The pram or boat is held or attached to the carrier 2 by means of conventional cam locks 4. There are also two pair of these not shown in detail, one pair on each side of the vehicle. These are positioned adjacent to the handles for easy manipulation of the boat and locking means.

The carrier 2 may be attached to the car by two pair of attaching means 5 as generally shown in FIGS. 1—4. The detailed attachment of the entire device will be discussed with relation to FIG. 10 below.

The fishing pram 1 as seen in FIGS. 6—8 and 10 includes inner and outer walls 7 and 8 respectively which may be fabricated of plastic or fiberglass or any other suitable material. The interior between the two shells which are bonded together at 7a includes foamed plastic material 9 such as formed by polystyrene or polyurethane to provide the necessary bouyancy to the boat. By designing the boat in such a manner, it will have a high strength to weight ratio and will be virtually unsinkable. By choice of the proper materials, the size and weight of the boat should be sufficient to support three or four persons and may be powered either by oars or an outboard motor of up to five horsepower.

Figure 9:
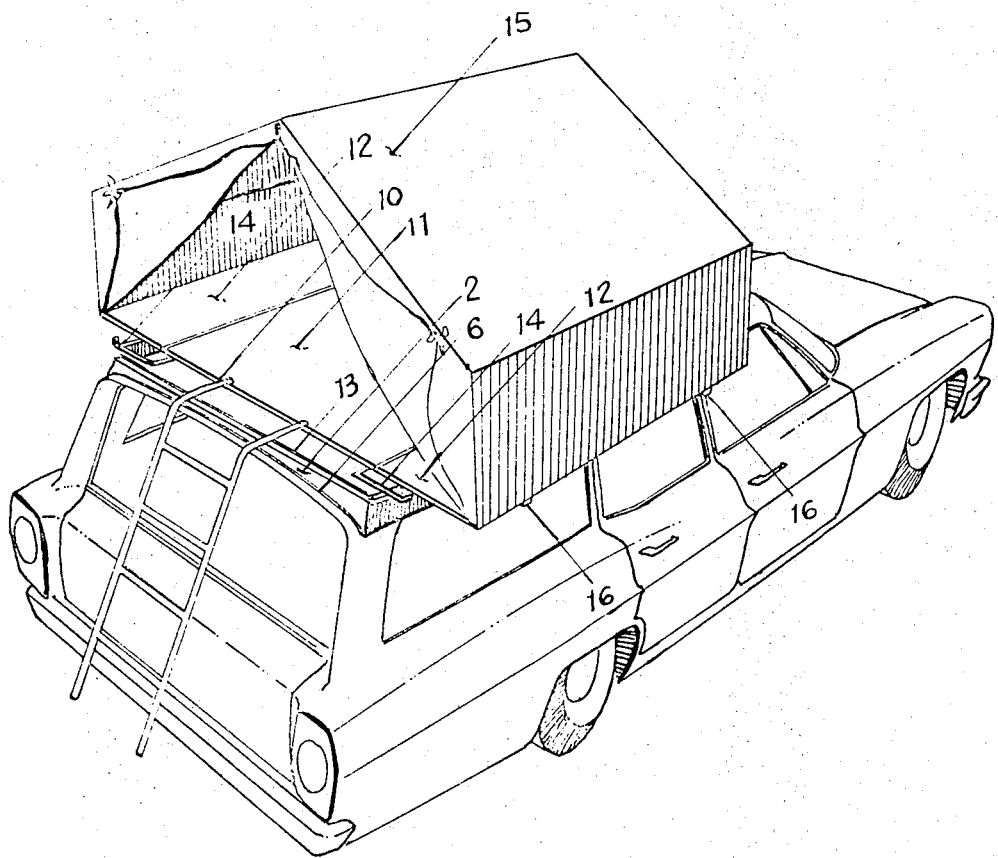
FIG. 9 illustrates the boat removed and the tent erected on top of the station wagon.
Figure 10:
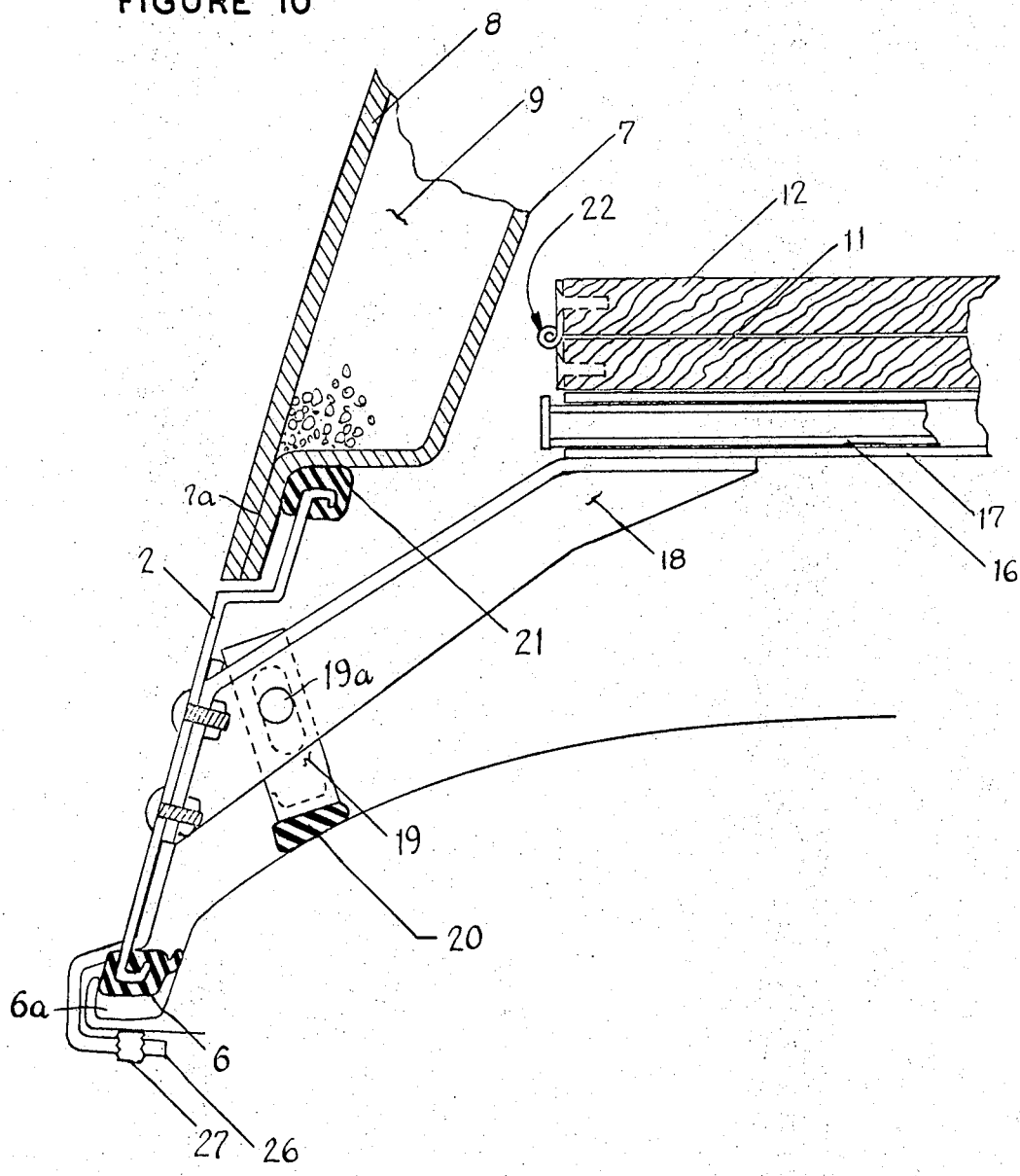
FIG. 10 illustrates a typical cross section through the boat-cover and tent floor, together with the device attached in its traveling position.
Figure 11:
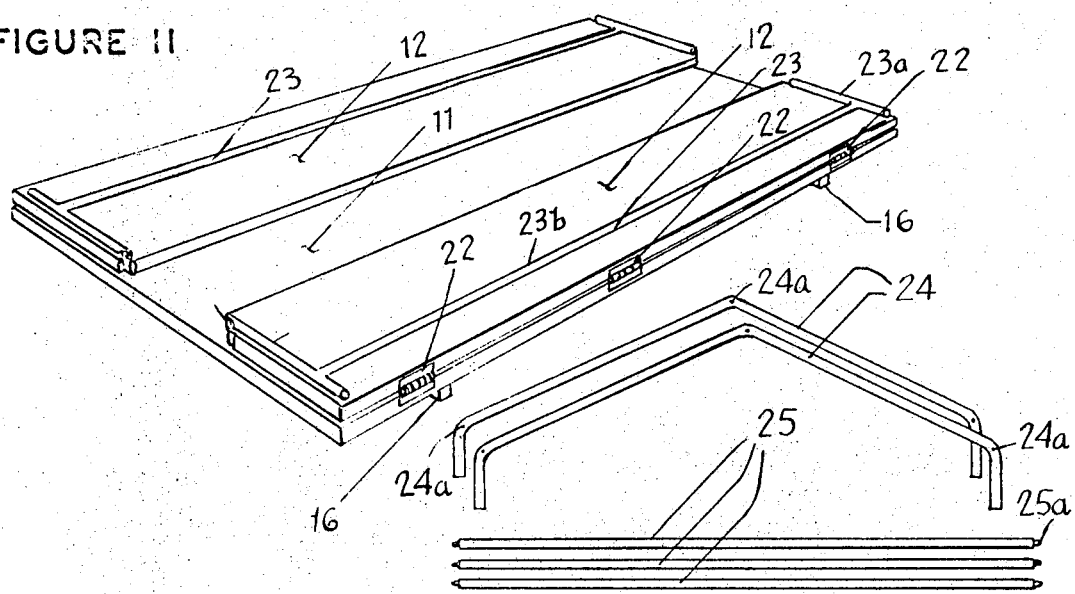
FIG. 11 is a perspective view of the tent floor in its folded position, together with loose frame members.
Figure 12:
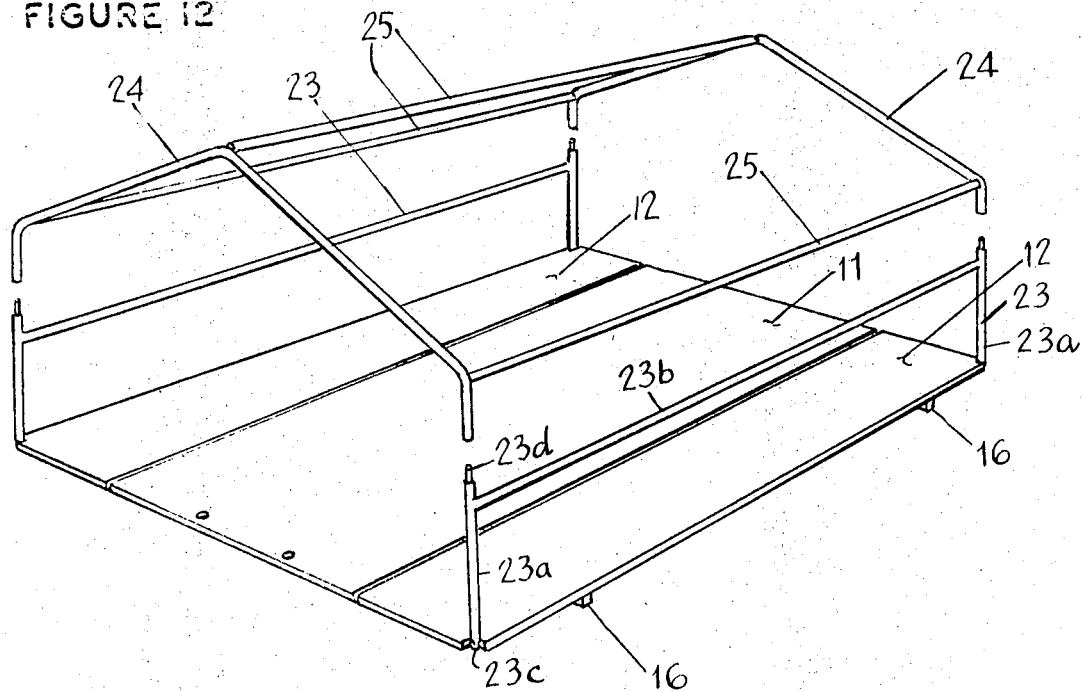
FIG. 12 is a perspective view of the tent floor expanded into its open position with the frame members in relatively exploded locations.

FIG. 9 illustrates a ladder 10 position against the rear of the vehicle and attached to a center section 11 of a tent floor. The floor has folding sections 12 which when folded outwardly form the entire tent floor extending beyond the edge of the vehicle, thus providing a relatively large floor area in comparison to the size of the vehicle top. This floor may be positioned on top of the carrier 2 on a sturdy railing or floor member 13. Support bracket means 14 may be positioned on the under side of the outer floor members 12 and extend below the inner floor 11 to add additional support. A tent 15, as will be discussed later, is positioned over supports on the floor. A plurality of sliding draw bars 16 as seen in FIGS. 9—12 are slideably mounted in floor braces 17. The floor braces 17 are attached to the carrier 2 by four brackets 18. This is best seen in FIG. 10 which discloses the detail of the boat over the folded floor portion. When the boat is removed the sliding draw bars 16 are moved from their contracted position as seen in FIG. 10 to their extended position as seen in FIGS. 9, 11, 12. This adds the additional rigidity to the outboard floor members 12 which extend over the side of the vehicle by providing longitudinal support means.

The support brackets 18 as seen in FIG. 10 may be attached in any conventional manner such as welding to the floor braces 17 and bolted to the carrier 2.

As will be further seen in FIG. 10, the device is positioned in the trough or roof drip molding 6a by means of the seal 6 which protects it from water leaking underneath. The entire device is positioned against the roof of the vehicle by means of adjustable standoff brackets 19 which have suitable adjusting means such as thumb screws 19a and include rubber pads which keep the roof of the vehicle from being marred. Again, the unit is secured to the roof drip molding 6a by means of the adjustable brackets indicated as 5 in FIGS. 1—4 or by a plurality of adjustable brackets 26 which are secured to the underside of the roof drip molding by a plurality of set screws 27 as further seen in FIG. 10.

It should be pointed out that the outboard floor portions 12 are attached to the center section 11 by means of a plurality of hinges indicated at 22 in FIGS. 10 and 11.

The remainder of the tent structure is best seen in FIGS. 11 and 12. FIG. 11 shows the device in its folded position together with the various frame members. FIG. 12 shows the floor unfolded and the draw bars 16 pulled out and the frame members in place. It will be noted that H-shaped members 23 having a pair of uprights 23a and a cross-piece 23b are pivotedly secured at 23c to the outboard floor members 12. When the outboard member 12 is unfolded on the hinge 22 the side frame 23 may be pivoted on point 23c and placed in the upright position. At that time a pair of bent top brackets 24 are secured to the upright member 23 by means of inserting a hollow portion thereof onto an extending pin 23d. Three cross-braces 25 having pins 25a on their ends are secured to openings 24a in the roof members 24.

It is apparent that the tent may be easily erected by unfolding element 12 and erecting the frame members 23, 24 and 25. The tent 15 is then placed over the top of the frame members in a conventional manner. It will be noted that the tent is of conventional design having two end panels as seen in FIG. 9 which can have a zipper type closure down the center. When the structure is in its traveling position, the tent 15 may be folded and placed on top of the floor 11 and 12 and under the boat. When it is in its extended position, it will be of sufficient size to sleep three or four adults comfortably. The frame members 24 and 25 are also stored under the boat.

Figure 13:
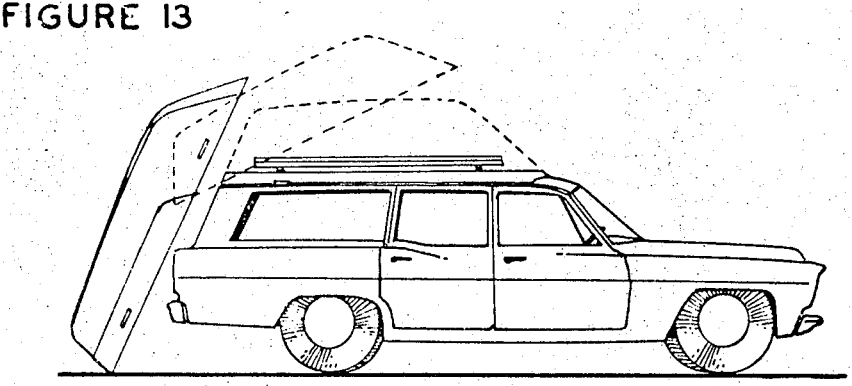
FIG. 13 shows a side elevation view of the removal of the boat-cover from the top of the station wagon and tent.

FIG. 13 shows a schematic of unloading the boat off of the rear of the vehicle.

I claim:

1. A vehicle top unit comprising:
   a. a vehicle top carrier having means connected thereto for securing a bottom portion in the drip molding of a vehicle and having an upper portion extending upwardly from the roof of the vehicle;
   b. a tent floor mounted on and supported by said carrier;
   c. said tent floor including a plurality of interconnected sections, said interconnected sections including a center section and a pair of outer floor members extendable beyond the edge of the carrier;
   d. a plurality of tent support frames mounted on said tent floor;
   e. a tent mountable on said support frame; and
   f. a boat when in its overturned position and placed on said carrier providing a cover for said tent, floor and support frames, a plurality of locking means for connecting said boat to said carrier, the hull of said boat being of a size such that in said overturned position said upwardly extending portion of said carrier being substantially collinear with said hull thereby providing substantially smooth meeting surfaces around the unit.

2. A vehicle top unit as defined in claim 1 wherein said center section covers approximately the width of the vehicle.

3. A vehicle top unit as defined in claim 1 wherein said outer floor members are pivotally secured to said center section.

4. A vehicle top unit as defined in claim 1 including substantially longitudinal support means movable outwardly from said center section under said outer sections.

5. A vehicle top unit as defined in claim 1 including a pair of side frames pivotally mounted on said outer floor members.

6. A vehicle top unit as defined in claim 5 including top frame members engageable with said side frames.

7. A vehicle top unit as defined in claim 1 including sealing means between said carrier and the top of the vehicle and between said carrier and said boat.

8. A vehicle top unit as defined in claim 1 wherein said boat has inner and outer shells and a foamed bouyant material therebetween.

9. A vehicle top unit as defined in claim 1 including adjustable means for positioning said carrier and tent floor relative to the top of the vehicle.